US012718230B2

(12) United States Patent
Kelley

(10) Patent No.: US 12,718,230 B2
(45) Date of Patent: Aug. 25, 2026

(54) SECURE CRYPTO CURRENCY POINT-OF-SALE (POS) MANAGEMENT

(71) Applicant: NCR Atleos Corporation, Atlanta, GA (US)

(72) Inventor: Aaron Lloyd Kelley, Duluth, GA (US)

(73) Assignee: NCR Atleos Corporation, Atlanta, GA (US)

( * ) Notice: Subject to any disclaimer, the term of this patent is extended or adjusted under 35 U.S.C. 154(b) by 0 days.

(21) Appl. No.: 17/530,862

(22) Filed: Nov. 19, 2021

(65) Prior Publication Data

US 2022/0076247 A1 Mar. 10, 2022

Related U.S. Application Data

(63) Continuation of application No. 14/554,758, filed on Nov. 26, 2014, now Pat. No. 11,238,443.

(51) Int. Cl.
*G06Q 20/36* (2012.01)
*G06Q 20/06* (2012.01)
*G06Q 20/20* (2012.01)
*G06Q 20/38* (2012.01)

(52) U.S. Cl.
CPC ....... *G06Q 20/3678* (2013.01); *G06Q 20/065* (2013.01); *G06Q 20/202* (2013.01); *G06Q 20/389* (2013.01); *G06Q 2220/00* (2013.01)

(58) Field of Classification Search
CPC .............................................. G06Q 20/00–425
See application file for complete search history.

(56) References Cited

U.S. PATENT DOCUMENTS 10,043,174 B1 8/2018 Chikkanna
2002/0165821 A1 11/2002 Tree
2009/0319382 A1 12/2009 Shah et al.
2015/0227910 A1* 8/2015 Maxwell ............. G06Q 20/382 705/44
2015/0356555 A1 12/2015 Pennanen

OTHER PUBLICATIONS

"U.S. Appl. No. 14/554,758, Advisory Action mailed Sep. 24, 2019", 3 pgs.
"U.S. Appl. No. 14/554,758, Final Office Action mailed Jul. 1, 2021", 21 pgs.
"U.S. Appl. No. 14/554,758, Final Office Action mailed Jul. 10, 2019", 22 pgs.
"U.S. Appl. No. 14/554,758, Non Final Office Action mailed Dec. 16, 2020", 18 pgs.

(Continued)

*Primary Examiner* — Mohammad A. Nilforoush
(74) *Attorney, Agent, or Firm* — Schwegman Lundberg & Woessner, P.A.

(57) ABSTRACT

A Point-Of-Sale (POS) terminal is equipped to process crypto currencies for transactions. The POS terminal generates a transaction-based digital wallet for a given transaction to receive a crypto currency payment for that given transaction. The transaction-based digital wallet, funded with the crypto currency for the given transaction, is transferred to a retailer's server where the crypto currency is transferred from the transaction-based digital wallet to a retailer's digital wallet for eventual exchange to a government issued currency.

6 Claims, 4 Drawing Sheets

(56) References Cited

OTHER PUBLICATIONS

"U.S. Appl. No. 14/554,758, Non Final Office Action mailed Dec. 31, 2018", 17 pgs.
"U.S. Appl. No. 14/554,758, Notice of Allowance mailed Sep. 29, 2021", 14 pgs.
"U.S. Appl. No. 14/554,758, Response filed Mar. 15, 2021 to Non Final Office Action mailed Dec. 16, 2020", 6 pgs.
"U.S. Appl. No. 14/554,758, Response filed Sep. 1, 2021 to Final Office Action mailed Jul. 1, 2021", 6 pgs.
"U.S. Appl. No. 14/554,758, Response filed Apr. 1, 2019 to Non Final Office Action mailed Dec. 31, 2018", 11 pgs.
"U.S. Appl. No. 14/554,758, Response filed Sep. 10, 2019 to Final Office Action mailed Jul. 10, 2019", 7 pgs.
U.S. Appl. No. 14/554,758 U.S. Pat. No. 11,238,443, filed Nov. 26, 2014, Secure Crypto Currency Point-of-Sale (POS).

* cited by examiner

SECURE CRYPTO CURRENCY POINT-OF-SALE (POS) MANAGEMENT

CROSS-REFERENCE TO RELATED APPLICATION

This application is a continuation of U.S. patent application Ser. No. 14/554,758, filed Nov. 26, 2014, which application and publication is incorporated herein by reference in its entirety.

BACKGROUND

Virtual/crypto currencies have been exploding in the global economic scene. For the most part, younger individuals and countries with volatile currencies were the first adopters of virtual currencies.

There are a variety of benefits associated with transacting with virtual currencies. For example, there is no or very little transaction fee; this is an attractive proposition to retailers. Moreover, payment is simple the payor scans the payee's digital wallet and then initiates a transfer of payment in the virtual currency from the payor's digital wallet to the payee's digital wallet. In the interim, there is a variety of confirmations that take place until the payee can confirm the appropriate amount of funds were transferred to the payee's digital wallet for a given transaction.

However, one concern associated with crypto currency payments is that the digital wallet of the payee or payor can be hacked and the crypto currency stolen by a hacker. A number of conditions contribute to this problem, one of which is the use of poor passwords with digital wallets. Another issue is keeping large sums of crypto currency in one single digital wallet, which makes hacking that wallet particularly attractive to a hacker.

Another issue with crypto currency is the fluctuations in price of the crypto currency relative to a government issued currency. Crypto currencies are traded 24 hours a day, 7 days a week, and 365 days a year, which also makes the fluctuations occur with more regularity than a traditional government-backed currency.

Therefore, there is a need for improved crypto currency management, particularly in situations where established retailers begin to accept such forms of currency for payment of goods and services.

SUMMARY

In various embodiments, secure crypto currency Point-Of-Sale (POS) management is presented. According to an embodiment, a method for crypto currency POS management is provided.

Specifically, a crypto currency requested for payment is identified for purposes of concluding a transaction at the POS terminal. Next, a transaction-specific digital wallet is obtained for receiving the crypto currency. Finally, an amount of the crypto currency is received to conclude the transaction in the transaction-specific digital wallet.

DETAILED DESCRIPTION

Figure 1:
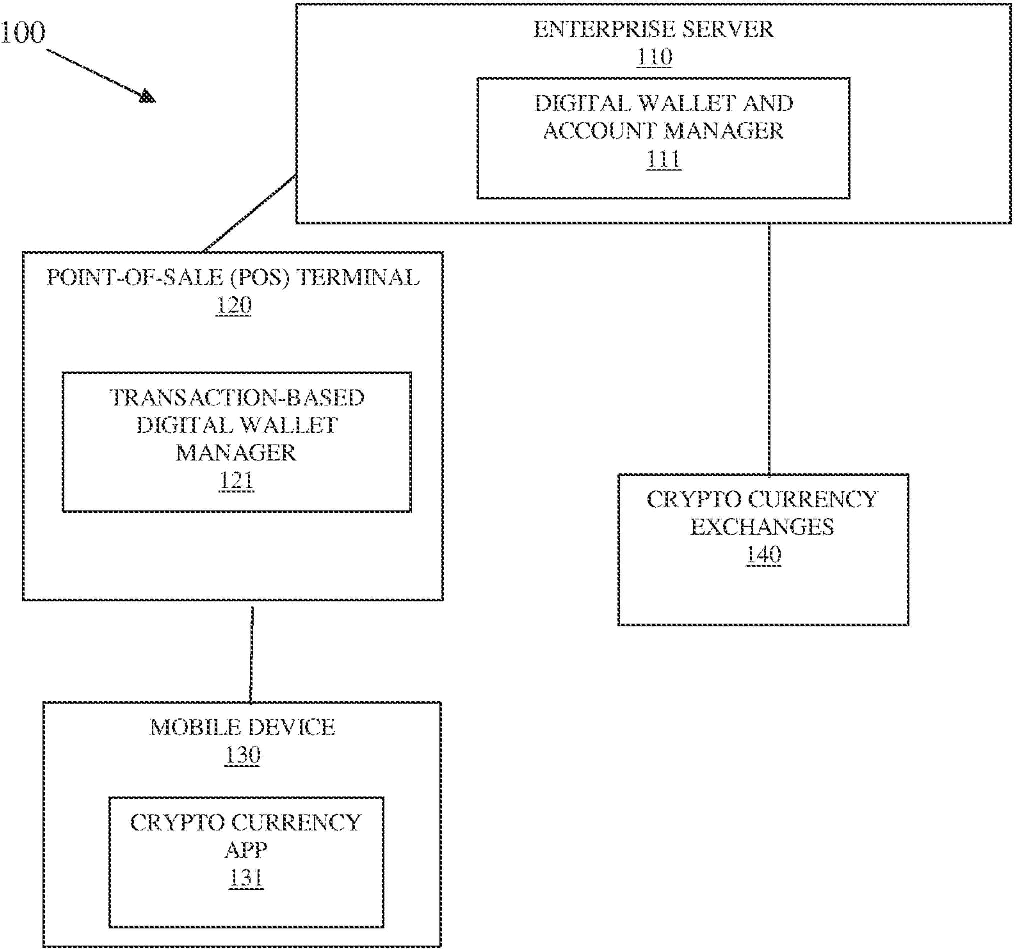
FIG. 1 is a diagram of an enterprise crypto currency management system, according to an example embodiment.

FIG. 1 is a diagram of an enterprise crypto currency management system 100, according to an example embodiment. The components of the enterprise crypto currency management system 100 are shown in greatly simplified form with only those components shown necessary for the understanding of the various embodiments of the invention.

As used herein, a "digital wallet" is a data structure that is uniquely addressable in physical storage. In some embodiments, the data structure includes an amount of crypto currency held in the storage. The amount may be represented in a non-encrypted format for human readability and in an encrypted format for electronic payment processing.

The enterprise crypto currency management system 100 includes an enterprise server 110, a Point-Of-Sale (POS) terminal 120, a mobile device 130, and one or more crypto currency exchanges 140. The enterprise server 110 includes a digital wallet and account manager 111. The POS terminal 120 includes a transaction-based digital wallet manager 121. The mobile device 130 includes a crypto currency application 131.

It is noted that there are a variety of crypto/virtual currencies. One particular currency has remained relatively stable and has garnered widespread support and application; that currency is Bitcoin™. As used here, a "crypto/virtual currency" includes Bitcoin™ and any crypto currency available. By definition, a crypto currency is not backed by any government and is therefore not considered to be a currency from the point of view of the government (at least not at this time). Legal tender is backed by a particular government and legal tender is not a crypto currency; "legal tender" may be used interchangeably herein with government issued/backed currency.

The components of the enterprise crypto currency management system 100 are now discussed within the context of a consumer's transaction at a retail store having the POS terminal 120 for purposes of illustrating various embodiments of the invention.

A consumer desires to purchase a good or service from a retailer with a crypto currency. The consumer has a mobile device 130 with one or more crypto currency applications 131 processing thereon. The consumer has a digital wallet or a mechanism for which the crypto currency can be sent from the consumer to the retailer. The consumer approaches the POS terminal 120 and makes an indication to the cashier that the consumer desires to conclude payment and a transaction using a crypto currency (assuming the POS terminal 120 is cashier assisted—it may be that the POS terminal 120 is a Self-Service Terminal (SST) in which case the consumer selects a crypto currency interface option to proceed with payment via the selected crypto currency, such as Bitcoin™).

The transaction-based digital wallet manager 121 then either selects a digital wallet from a plurality of digital wallets that the transaction-based digital wallet manager 121 had previously generated, perhaps, on startup of the POS terminal 120. In some cases, the transaction-based digital wallet manager 121 dynamically generates the digital wallet based on the transaction with the customer. That is, the digital wallet (whether selected from a pre-generated list of available wallets or whether dynamically generated) is unique tied and associated with the transaction of the customer. So, there is a single wallet that can be tied to the specific transaction of the customer with the POS terminal 120.

In an embodiment, the transaction-based digital wallet manager 121 uses a transaction identifier for the transaction with the customer to generate an identifier for the dynamically generated wallet.

At any rate, the transaction-based digital wallet manager 121 maintains an internal mapping and identifier that links the transaction identifier that the customer is engaged in with the specific digital wallet that is selected or generated for that transaction. This, as will be demonstrated later, permits the enterprise (via the digital wallet and account manager 111) to maintain transaction specific record with crypto currency transactions.

Once the wallet is generated or selected, the transaction-based digital wallet manager 121 or another application processing on the POS terminal 120 determines an exchange rate for the selected crypto currency into a desired or acceptable (to the enterprise/retailer) government issued currency. This can be done periodically or in real time, such as through the digital wallet and account manager 111 checking with one or more crypto currency exchanges 140. Once this is done, the POS terminal 120 knows the amount of the crypto currency that is needed to comport with an acceptable government issued currency, which can then be communicated to the customer engaged in the transaction at the POS terminal 120.

In an embodiment, the POS terminal 120 is a cashier-assisted terminal where the amount of the crypto currency needed for the transaction is communicated by a cashier to the customer.

In an embodiment, the POS terminal 120 is a Self-Service Terminal (SST) where the amount of crypto currency needed for the transaction is displayed on a display of the SST.

In an embodiment, the POS terminal 120 establishes a wireless pairing with the mobile device 130 of the customer at the POS terminal 120 and wirelessly communicates the amount of crypto currency needed for the transaction to the mobile device 130 or the crypto currency application 131 processing on the mobile device 130.

At this point, the customer knows the amount of crypto currency needed to conclude payment for the transaction at the POS terminal 120 and the transaction-based digital wallet manager 121 has generated a transaction-specific digital wallet to receive that amount of crypto currency from the customer.

The POS terminal 120 then displays a transaction-specific digital wallet (address of a digital account) as a barcode or Quick Response (QR) code on a display of the POS terminal 120, or the POS terminal 120 prints a QR code. The consumer then scans the QR code (using the mobile device's camera) to acquire the address to the digital wallet of the retailer. The crypto currency application 131 is then accessed by the consumer on the mobile device 130 to transfer a crypto currency amount representing the legal tender (government issued currency) total for the consumer's transaction.

Once the required amount of crypto currency is received and confirmed by the POS terminal 120 (by indication that the amount of crypto currency is now present in the transaction-specific digital wallet of the POS terminal 120), the POS terminal 120 may immediately transfer the amount from its wallet to the retailer's wallet (through the digital wallet and account manager 111) or sends a notification to the digital wallet and account manager 111 that the funds are present in a transaction-specific wallet being held at the POS terminal 120.

In an embodiment, the transaction-based digital wallet manager 121 batches and sends the transaction-specific wallets for all concluded transactions at predefined intervals to the digital wallet and account manager 111 (push technique pushed from the POS terminal 120 to the enterprise server 110).

In an embodiment, the transaction-based digital wallet manager 121 sends all transaction-specific wallets for all concluded transactions at a request made by the digital wallet and account manager 111 (pull technique pulled by the enterprise server 110 from the POS terminal 120).

The digital wallet and account manager 111 maintains a single enterprise/retailer digital wallet and maintains a record (log, table, ledger, etc.) of all the independent POS transaction-specific wallets. The enterprise wallet is secure maintained with limited access capability. Moreover, a hacker that might be able to hack a specific transaction wallet would possess know useful knowledge that would allow hacking other transaction-specific wallets or the enterprise wallet. This ensures security and ensures that any breach is limited to a single transaction.

The digital wallet and account manager 111 may also perform a variety of other useful features such as, maintaining profitability or loss based on exchanged out rates on a per transaction basis, transaction class basis, POS terminal basis, time-of-day basis, day of week basis, weekly basis, monthly basis, etc.

The digital wallet and account manager 111 also decides when to transfer the crypto currency amount from the transaction-specific wallet to the enterprise wallet and when to exchange the crypto currency for a desired government backed currency, perhaps using a variety of information, such as but not limited to: exchange rates acquired from the crypto currency exchanges 140, trend analysis for the crypto currency in terms of its value relative to the desired government issued currency, news and business feed analysis relevant to the crypto currency, and the like.

It is noted that the techniques described with the FIG. 1 work with multiple different POS terminals and with multiple different crypto currencies.

In an embodiment, the POS terminal 120 is a kiosk.

In an embodiment, the POS terminal 120 is an Automated Teller Machine (ATM).

In an embodiment, the POS terminal 120 is a SST.

In an embodiment, the POS terminal 120 is a cashier-assisted terminal.

Figure 2:
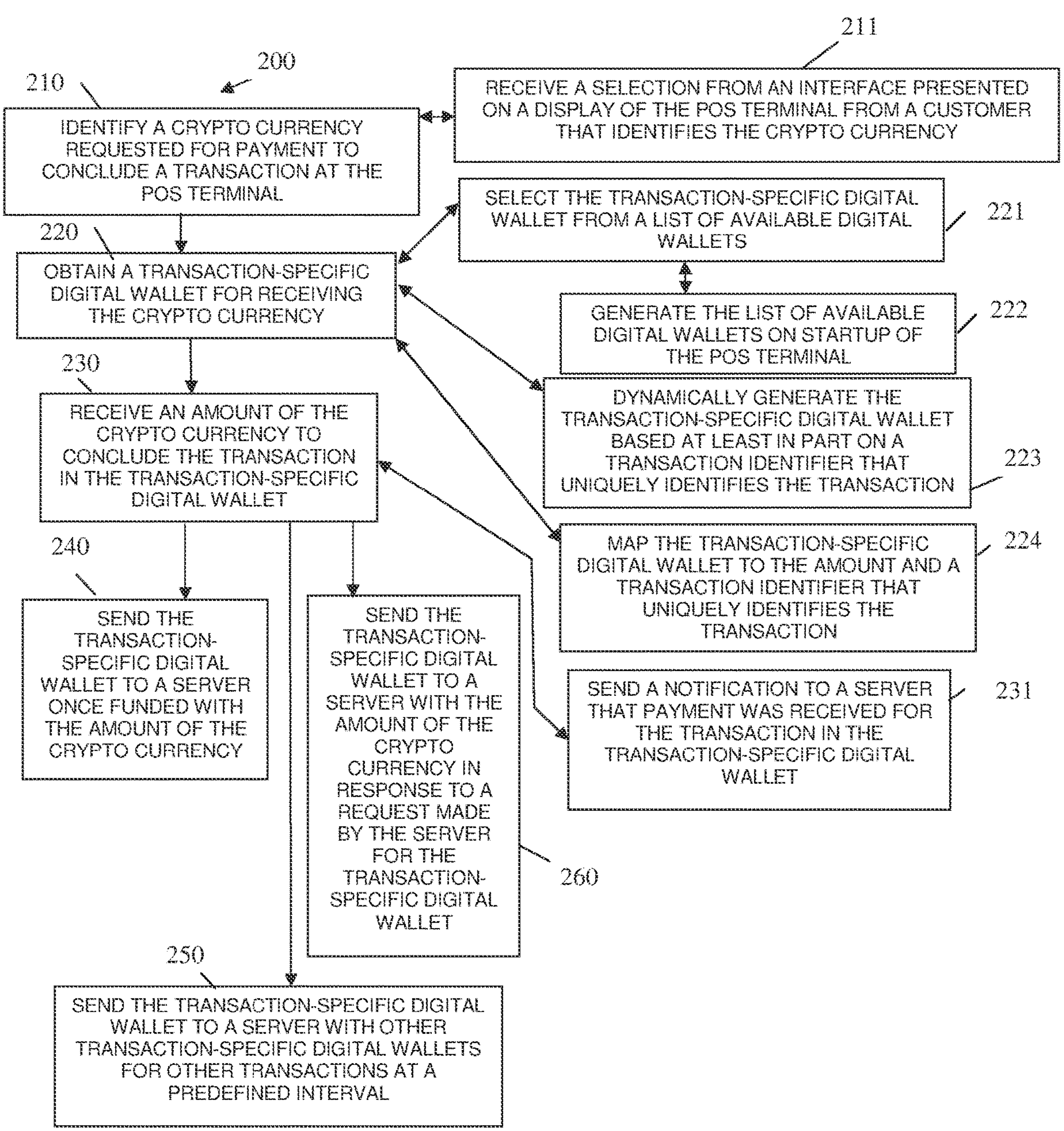
FIG. 2 is a diagram of a method for managing crypto currency at a Point-Of-Sale (POS) terminal within an enterprise, according to an example embodiment.
Figure 3:
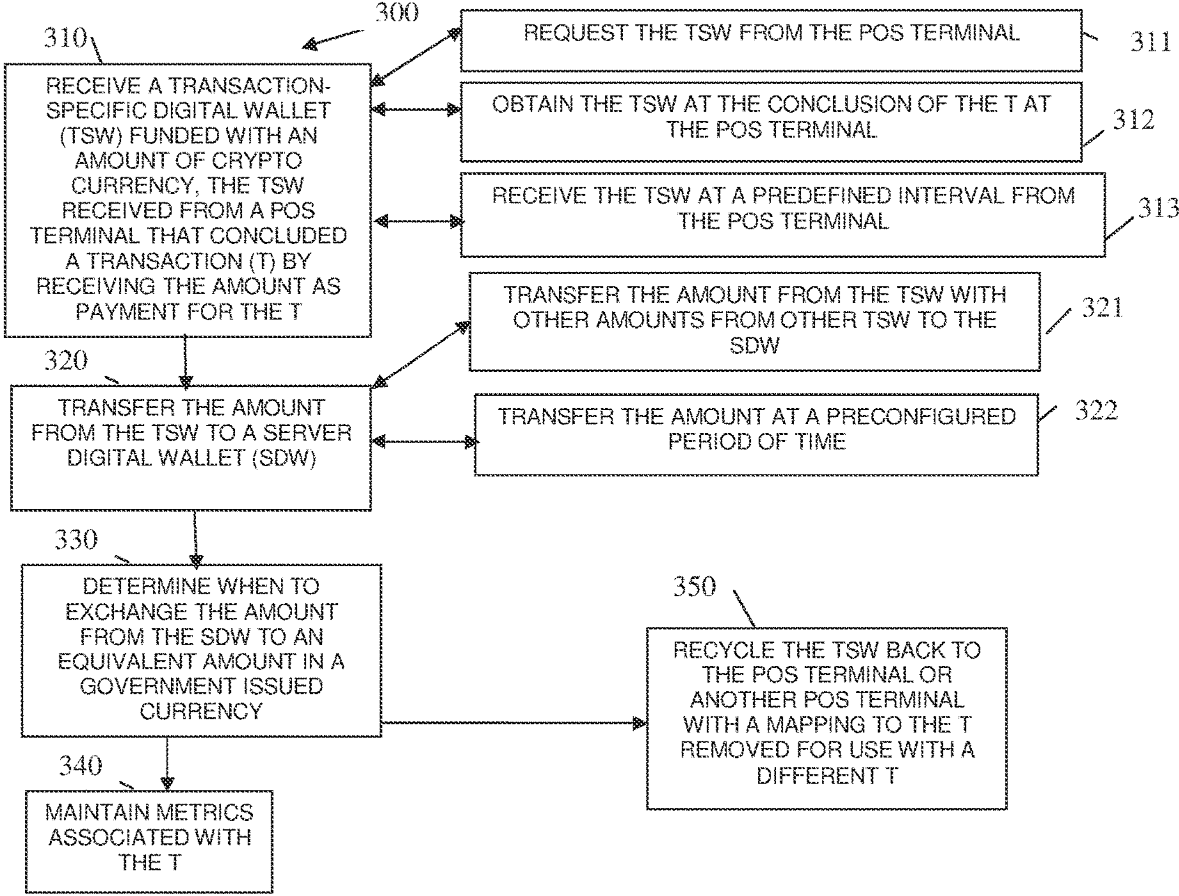
FIG. 3 is a diagram of another method for managing crypto currency at a POS terminal within an enterprise, according to an example embodiment.
Figure 4:
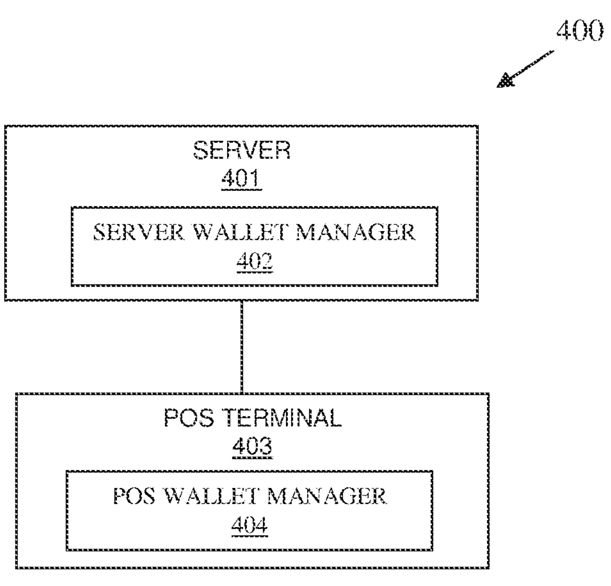
FIG. 4 is a diagram of a crypto currency management system, according to an example embodiment.

The above-discussed embodiments and other embodiments are now presented with the discussions of the FIGS. 2-4.

FIG. 2 is a diagram of a method 200 for managing crypto currency at a Point-Of-Sale (POS) terminal within an enterprise, according to an example embodiment. The method 200 (hereinafter "POS digital wallet manager") is implemented as instructions programmed and residing in memory or on a non-transitory computer-readable (processor-readable) storage medium and executed by one or more processors of a POS terminal. The processors are specifically configured and programmed to process the POS digital wallet manager. The POS digital wallet manager operates over one or more networks. The networks are wired, wireless, or a combination of wired and wireless.

In an embodiment, the POS digital wallet manager is an instance of the transaction-based digital wallet manager 111 of the FIG. 1.

In an embodiment, the POS digital wallet manager is executed on the POS terminal 120 of the FIG. 1.

In an embodiment, the POS terminal is a kiosk.

In an embodiment, the POS terminal is a SST.

In an embodiment, the POS terminal is an ATM.

In an embodiment, the POS terminal is a cashier-assisted checkout terminal.

In an embodiment, the POS digital wallet manager interacts with the enterprise server 110 of the FIG. 1.

In an embodiment, the crypto currency is Bitcoin™.

At 210, the POS digital wallet manager identifies a crypto currency requested for payment to conclude a transaction at the POS terminal. This can be done in a number of manners at the POS terminal.

For example, at 211, the POS digital wallet manager receives a selection from an interface presented on a display of the POS terminal having an indication that a customer wants to conclude the transaction with a payment option that includes a specific selected crypto currency payment. This may be a situation where the POS terminal is a SST.

In another case, a cashier asks the customer or the customer indicates that payment is to be with a specific selected crypto currency and it is the cashier that activates a selection from an interface presented on the POS terminal indicating that the customer is paying with the selected crypto currency.

At 220, the POS digital wallet manager obtains a transaction-specific digital wallet for receiving the crypto currency. This can be achieved in a few manners as well both of which are automatic and both of which select or produce a digital wallet that is specific to or uniquely mapped to the transaction of the customer at the POS terminal.

For example, at 221, the POS digital wallet manager selects the transaction-specific digital wallet from a list of available digital wallets. That is, the POS digital wallet manager has a listing of wallets that can be assigned uniquely to the transaction with the customer and the POS digital wallet manager selects one of those wallets for the transaction.

In an embodiment of 221 and at 222, the POS digital wallet manager generates the list of available digital wallets on startup or power up of the POS terminal. In another case, the POS digital wallet manager receives the list of available digital wallets from a pool of managed wallets on a server that are recycled after funds are transferred on a per transaction bases. Should the POS digital wallet manager reach a threshold where the list of available digital wallets are low a request can be made or the situation can be automatically detected by a monitoring server application and more recycled digital wallets delivered to the POS terminal for use.

According to an embodiment, at 223, the POS digital wallet manager dynamically generates the transaction-specific digital wallet based at least in part on a transaction identifier that uniquely identifies the transaction. That is, the digital wallets are established with a digital wallet service based on each requested transaction using the crypto currency in a dynamic and on-demand basis.

In an embodiment, at 224, the POS digital wallet maps the transaction-specific digital wallet to the amount and a transaction identifier that uniquely identifies the transaction. So, the transaction-specific digital wallet can be dynamically requested or essentially generated or acquired from a list of available digital wallets, but, however the transaction-specific digital wallet is obtained it is uniquely tied to and associated with the transaction to which it relates, at least until the amount of crypto currency for the transaction is transferred out of the transaction-specific digital wallet (in which case the transaction-specific digital wallet is free to be re-cycled for other specific transactions at the POS terminal or other POS terminals within an enterprise).

At 230, the POS digital wallet receives an amount of the crypto currency to conclude the transaction in the transaction-specific digital wallet. Here, the POS digital wallet is assured that the proper payment has been successfully made to conclude the transaction because the transaction-specific digital wallet has a balance indicating that the funds were received.

In an embodiment, at 231, the POS digital wallet sends a notification to a server that payment was received for the transaction in the transaction-specific digital wallet. This allows for proper accounting. This does not mean that the wallet is sent to the server just that the server knows the funds for the transaction exists in the transaction-specific wallet.

According to an embodiment, at 240, the POS digital wallet manager sends the transaction-specific digital wallet to a server once funded with the amount of the crypto currency. Here, funds are sent as soon as received in the transaction-specific digital wallet.

In another case, at 250, the POS digital wallet manager sends the transaction-specific digital wallet to a server with other transaction-specific digital wallets for other transactions at a predefined interval. The interval can be time of event based. An event-based event can include when a new cashier takes over for an existing cashier at the POS terminal or when the POS terminal is shut down for the day.

In still another situation, at 260, the POS digital wallet manager sends the transaction-specific digital wallet to a server with the amount of the crypto currency in response to a request made by the server for the transaction-specific digital wallet. Here, the server is making the request for the transaction-specific digital wallet (this is a pull approach as opposed to the push approaches discussed above at 240 and 250).

Moreover, it is noted that when the transaction-specific digital wallet is sent to the server this may just mean that the address for the digital wallet along with the proper credentials for the digital wallet is sent to the server, such that the server can access the digital wallet and properly transfer the funds out of the digital wallet when needed.

It is also to be noted that when a digital wallet is requested or generated, the credentials for accessing that digital wallet by the owner is created. This can be randomly created by the POS digital wallet manager when requested or generated by the POS digital wallet manager or can be supplied, if needed, from the server to the POS digital wallet manager for any pool of recycled digital wallets being distributed and managed by the server.

FIG. 3 is a diagram of another method 300 for managing crypto currency at a POS terminal within an enterprise, according to an example embodiment. The method 300 (hereinafter "server digital wallet manager") is implemented as instruction and programmed within memory or a non-transitory computer-readable (processor-readable) storage medium that executes on one or more processors of one or more devices of a server; the processors of the server are specifically configured to execute the server digital wallet manager. The server digital wallet manager is operational over one or more networks; the networks may be wireless, wired, or a combination of wired and wireless.

The server digital wallet manager interacts with the POS digital wallet manager of the FIG. 2.

In an embodiment, the server digital wallet manager is at least partially the digital wallet and account manager 111 of the FIG. 1.

In an embodiment, the server digital wallet manager executes on the server 110 of the FIG. 1.

In an embodiment, the server digital wallet manager executes on one or more servers associated with a cloud-based processing environment.

At 310, the server digital wallet manager receives a transaction-specific digital wallet funded with an amount of crypto currency. The transaction-specific digital wallet received from a POS terminal that concluded a transaction by receiving the amount as payment for the transaction. Again, this may entail receive the address to the digital wallet from the POS terminal along with the credentials for accessing the digital wallet (unless the server digital wallet manager manages and already has the necessary credentials for accessing the digital wallet, as discussed above).

According to an embodiment, at 311, the server digital wallet manager requests the transaction-specific digital wallet from the POS terminal. This is a pull technique where the wallet is obtained upon request by the server digital wallet manager.

In another case, at 312, the server digital wallet manager obtains the transaction-specific digital wallet from the POS terminal at the conclusion of a transaction that funded the wallet with crypto currency as payment for the transaction. This is a push technique where the POS terminal actively pushes the wallet to the server digital wallet manager.

In yet another situation, at 313, the server digital wallet manager at a predefined interval or upon the occurrence of an event from the POS terminal. This is another push-based approach as was the embodiment at 312.

At 320, the server digital wallet transfers an amount of crypto currency present in the transaction-specific digital wallet to a single server digital wallet. This server-based wallet is securely held at the server and is not directly accessible over the network to the POS terminal or to other POS terminals interfaced to the server.

According to an embodiment, at 321, the server digital wallet manager transfers the amount of the crypto currency present in the transaction-specific digital wallet from the POS terminal to the server digital wallet along with a plurality of other amounts for the crypto currency present in other transaction-specific digital wallets for other transactions. The other wallets can be from the POS terminal, from other POS terminals, or from a combination of wallets from the POS terminal and the other POS terminals.

In an embodiment, at 322, the server digital wallet manager transfers the amount of the crypto currency from the transaction-specific digital wallet at a preconfigured period of time and/or upon the detection of a preconfigured event.

At 330, the server digital wallet manager determines when to exchange the amount from the server digital wallet to an equivalent amount in a government issued currency. This can be time or event based.

According to an embodiment, at 340, the server digital wallet maintains metrics associated with the transaction-specific digital wallet and the transaction. The metrics can include a variety of information, such as but not limited to, wallet identifier, customer identifier, goods or service identifiers for the transaction, transaction identifier, crypto currency identifier, time and date of the transaction, and others.

In an embodiment, at 350, the server digital wallet manager recycles the transaction-specific digital wallet back to the POS terminal or another POS terminal with a mapping to the transaction removed for use with a different transaction. This entails sending the address to the recycled wallet, and perhaps, if needed the credentials for accessing the recycled wallet to the POS terminal.

FIG. 4 is a diagram of a crypto currency management system 400, according to an example embodiment. The components of the crypto currency management system 400 are implemented as executable instructions and programmed within a non-transitory computer-readable (processor-readable) storage medium that execute on one or more processors of one or more devices; the processors are specifically configured to execute the components of the crypto currency management system 400. The crypto currency management system 400 is also operational over one or more networks; any such networks may be wired, wireless, or a combination of wired and wireless.

The crypto currency management system 400 includes a server 401 having a server wallet manager 402 and a POS terminal 403 having a POS wallet manager 404.

In an embodiment, the server 401 is the enterprise server 110 of the FIG. 1.

In an embodiment, the server wallet manager 402 is the digital wallet and account manager 111 of the FIG. 1.

In an embodiment, the server wallet manager 402 is the method 300 of the FIG. 3.

In an embodiment, the POS terminal 403 is the POS terminal 120 of the FIG. 1.

In an embodiment, the POS wallet manager 404 is the transaction-based digital wallet manager 121 of the FIG. 1.

In an embodiment, the POS wallet manager 404 is the method 200 of the FIG. 2.

In an embodiment, the POS terminal 403 is a kiosk.

In an embodiment, the POS terminal 403 is a SST.

In an embodiment, the POS terminal 403 is an ATM.

In an embodiment, the POS terminal 403 is a cashier-assisted checkout terminal.

In an embodiment, the server 401 is a grouping of hardware and software resources operating as a cloud processing environment.

The server 401 includes one or more processors, memory, storage devices, and network connections and interfaces.

The server wallet manager 402 is configured and adapted to: execute on the server, receive transaction-specific digital wallets for transactions conducted at the POS terminal 403; and transfer sums of crypto currency out of the transaction-specific digital wallets to a single service digital wallet.

The POS terminal 403 includes one or more processors, memory, storage devices, peripherals, and network connections and interfaces.

The POS wallet manager 404 is configured and adapted to: execute on the POS terminal, assign one of the transaction-specific digital wallets to a specific one of the transactions and receive an amount of the crypto currency into that transaction-specific digital wallet as payment for that specific transaction, and send the transaction-specific digital wallets to the sever wallet manager.

According to an embodiment, the POS wallet manager 404 is further adapted and configured to select from a list of available digital wallets for use within a specific transaction and generate each of the transaction-specific digital wallets as needed for each of the transactions.

In an embodiment, passwords associated with each of the transaction-specific digital wallets are randomly generated.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:

maintaining, by a processor of a server, a retailer-specific digital wallet for a store, wherein the retailer-specific digital wallet is securely held and is not accessible over a network to transaction terminals of the store;

receiving, by the server and from transaction terminals of the store, transaction-based digital wallets, wherein each transaction-based digital wallet is received from a corresponding transaction terminal with credentials for accessing a corresponding transaction-based digital wallet and each transaction-based digital wallet funded with cryptocurrency used as a corresponding payment for a corresponding transaction at the corresponding transaction terminal;

transferring, by the server, a corresponding cryptocurrency amount from each corresponding transaction-based digital wallet to the retailer-specific digital wallet for the store using corresponding credentials upon detection that the corresponding cryptocurrency amount is present in the corresponding transaction-based digital wallet; and pushing and releasing as being available, by the server, the transaction-based digital wallets back to the transaction terminals for use in payments with subsequent transactions by the transaction terminals after the server transfers the corresponding cryptocurrency amount from the corresponding transaction-based digital wallet to the retailer-specific digital wallet for the store using corresponding credentials; and wherein the transaction-based digital wallets are recycled for use with different transactions at the transaction terminals, wherein any security breach is limited to a single transaction;

wherein the retailer-specific digital wallet is maintained by a digital wallet and account manager that maintains a record of all independent POS transaction-specific wallets associated with the digital wallet and account manager, and wherein the digital wallet and account manager decides when to exchange the cryptocurrency for a desired government backed currency based on exchange rates acquired from cryptocurrency exchanges, trend analysis for the cryptocurrency in terms of its value relative to a desired government issued currency, and news and business feed analysis relevant to the cryptocurrency.

2. The method of claim 1 further comprising, exchanging, by the server, corresponding cryptocurrency amounts held in the retailer-specific digital wallet to a government issued currency with a cryptocurrency exchange.

3. The method of claim 2 further comprising, securely holding, by the server, the retailer-specific digital wallet so that the retailer-specific digital wallet is not directly accessible by the transaction terminals over a network.

4. The method of claim 1 further comprising, maintaining metrics for each transaction-based digital wallet and each corresponding transaction at each corresponding transaction terminal, wherein the metrics comprise, each transaction, a particular transaction-based digital wallet identifier and wherein each record comprises a specific transaction identifier, specific transaction details, a transaction date, a transaction time of day, and a specific cryptocurrency amount.

5. The method of claim 1, wherein pushing to and releasing as being available further includes transferring each cryptocurrency amount from each transaction-based digital wallet to the retailer-specific digital wallet using corresponding credentials at a preconfigured interval or time or upon detection of a preconfigured event.

6. The method of claim 5, wherein pushing to and releasing as being available further includes recycling a particular transaction-based digital wallet back to a particular transaction terminal with a mapping to a specific transaction removed.

* * * * *